United States Patent
Raemy et al.

(10) Patent No.: US 9,947,311 B2
(45) Date of Patent: Apr. 17, 2018

(54) SYSTEMS AND METHODS FOR AUTOMATIC PHONETIZATION OF DOMAIN NAMES

(71) Applicant: VERISIGN, INC., Reston, VA (US)

(72) Inventors: Vincent Raemy, Fribourg (CH); Vincenzo Russo, Belp (CH); Jean Hennebert, Thun (CH); Baptiste Wicht, Bonnefontaine (CH)

(73) Assignee: VERISIGN, INC., Reston, VA (US)

( * ) Notice: Subject to any disclaimer, the term of this patent is extended or adjusted under 35 U.S.C. 154(b) by 0 days.

(21) Appl. No.: 14/977,133

(22) Filed: Dec. 21, 2015

(65) Prior Publication Data

US 2017/0178621 A1 Jun. 22, 2017

(51) Int. Cl.
*G10L 13/00* (2006.01)
*G10L 13/08* (2013.01)
(Continued)

(52) U.S. Cl.
CPC ............ *G10L 13/08* (2013.01); *G10L 13/043* (2013.01); *G10L 13/10* (2013.01)

(58) Field of Classification Search
CPC ....... G10L 13/08; G10L 13/00; G10L 15/187; G10L 2015/025; H04L 61/1511
(Continued)

(56) References Cited

U.S. PATENT DOCUMENTS

| | | |
|---|---|---|
| 5,429,513 A | 7/1995 | Diaz-Plaza |
| 5,588,056 A | 12/1996 | Ganesan |

(Continued)

FOREIGN PATENT DOCUMENTS

| | | |
|---|---|---|
| EP | 2592570 A2 | 5/2013 |
| EP | 2913986 A1 | 9/2015 |

OTHER PUBLICATIONS

Verisign Labs Distinguished Speakers Series, Speakers Professor Jean Hennebert and Professor Philippe Cudré-Mauroux, "Exascale Data and International Domain Phonetics—Two Swiss University Collaborations at Verisign EMEA", Jun. 26, 2014, Retrieved from the internet: https://www.verisign.com/en_US/company-information/verisign-abs/speakers-series/exascale/index.xhtml, Slides from presentation pp. 1-13.

(Continued)

*Primary Examiner* — Olujimi Adesanya
(74) *Attorney, Agent, or Firm* — MH2 Technology Law Group, LLP

(57) ABSTRACT

A method can include receiving, from a user, a string of characters. The method can also include determining components of the string of characters. The components of the string of characters may include one or more graphemes that are related in the string of characters. The method can include determining universal phonetic representations for the components of the string of characters. The method can also include determining pronunciations for the universal phonetic representations. Additionally, the method can include constructing a pronunciation of the string of characters based at least partially on the pronunciations of the universal phonetic representations. Further, the method can include sending, to the user, a sound file representing the pronunciation of the string of characters.

20 Claims, 9 Drawing Sheets

(51) Int. Cl.
*G10L 13/10* (2013.01)
*G10L 13/04* (2013.01)

(58) Field of Classification Search
USPC .............................. 704/9, 10, 256, 258, 270
See application file for complete search history.

(56) References Cited

U.S. PATENT DOCUMENTS

| | | | |
|---|---|---|---|
| 5,592,585 A | 1/1997 | Van Coile et al. | |
| 5,850,448 A | 12/1998 | Ganesan | |
| 6,018,736 A | 1/2000 | Gilai et al. | |
| 6,078,885 A * | 6/2000 | Beutnagel | G10L 15/063 704/231 |
| 6,108,627 A | 8/2000 | Sabourin | |
| 6,347,295 B1 | 2/2002 | Vitale et al. | |
| 6,557,026 B1 | 4/2003 | Stephens, Jr. | |
| 7,171,362 B2 | 1/2007 | Hain | |
| 7,188,138 B1 | 3/2007 | Schneider | |
| 7,292,980 B1 * | 11/2007 | August | G10L 13/00 704/251 |
| 7,406,417 B1 | 7/2008 | Hain | |
| 7,539,774 B2 | 5/2009 | Stahura | |
| 7,784,026 B1 * | 8/2010 | Wong | G06F 9/4448 717/109 |
| 8,060,565 B1 | 11/2011 | Swartz | |
| 8,291,048 B2 | 10/2012 | Cartmell et al. | |
| 8,356,081 B2 | 1/2013 | Broadhurst et al. | |
| 8,812,300 B2 * | 8/2014 | Gillam | G06F 17/30634 704/10 |
| 8,855,998 B2 * | 10/2014 | Gillam | G06F 17/2715 704/10 |
| 8,909,558 B1 | 12/2014 | Nicks et al. | |
| 9,058,393 B1 | 6/2015 | Nicks et al. | |
| 2002/0046025 A1 | 4/2002 | Hain | |
| 2002/0049591 A1 | 4/2002 | Hain | |
| 2002/0083029 A1 * | 6/2002 | Chun | G06F 9/4448 706/45 |
| 2004/0059574 A1 * | 3/2004 | Ma | G10L 13/08 704/254 |
| 2006/0031579 A1 | 2/2006 | Tout | |
| 2006/0149543 A1 | 7/2006 | Lassalle | |
| 2006/0195319 A1 | 8/2006 | Prous Blancafort et al. | |
| 2006/0215821 A1 | 9/2006 | Rokusek et al. | |
| 2006/0265220 A1 | 11/2006 | Massimino | |
| 2007/0016421 A1 * | 1/2007 | Nurminen | G10L 13/08 704/260 |
| 2007/0055515 A1 | 3/2007 | Lassalle | |
| 2007/0073542 A1 | 3/2007 | Chittaluru et al. | |
| 2007/0083369 A1 * | 4/2007 | McCuller | G10L 15/187 704/254 |
| 2007/0112569 A1 | 5/2007 | Wang et al. | |
| 2007/0118377 A1 | 5/2007 | Badino et al. | |
| 2007/0150279 A1 | 6/2007 | Gandhi et al. | |
| 2007/0233490 A1 * | 10/2007 | Yao | G10L 13/08 704/260 |
| 2008/0201487 A1 | 8/2008 | Blinn et al. | |
| 2009/0254545 A1 | 10/2009 | Fisken | |
| 2009/0265171 A1 | 10/2009 | Davis | |
| 2010/0010815 A1 * | 1/2010 | Bells | G10L 13/08 704/260 |
| 2010/0131267 A1 | 5/2010 | Silbert et al. | |
| 2010/0153115 A1 * | 6/2010 | Klee | G10L 13/08 704/260 |
| 2010/0217842 A1 | 8/2010 | Shuster | |
| 2010/0299133 A1 | 11/2010 | Kopparapu et al. | |
| 2010/0325128 A1 | 12/2010 | Adelman et al. | |
| 2010/0325253 A1 | 12/2010 | Adelman et al. | |
| 2011/0093259 A1 | 4/2011 | Saffer | |
| 2011/0208800 A1 | 8/2011 | Nicks | |
| 2011/0250570 A1 * | 10/2011 | Mack | G09B 19/04 434/169 |
| 2011/0313762 A1 | 12/2011 | Ben-David et al. | |
| 2012/0005571 A1 * | 1/2012 | Tang | G06F 17/289 715/234 |
| 2012/0046948 A1 * | 2/2012 | Leddy | G10L 13/033 704/260 |
| 2012/0084281 A1 | 4/2012 | Colosi | |
| 2012/0116778 A1 | 5/2012 | Fleizach et al. | |
| 2012/0173490 A1 | 7/2012 | Gould et al. | |
| 2012/0271878 A1 | 10/2012 | Nicks et al. | |
| 2013/0091143 A1 | 4/2013 | Raemy et al. | |
| 2013/0117013 A1 * | 5/2013 | Mugali, Jr. | G06F 17/28 704/9 |
| 2013/0132069 A1 | 5/2013 | Wouters et al. | |
| 2013/0211821 A1 * | 8/2013 | Tseng | G06F 17/273 704/9 |
| 2013/0231917 A1 * | 9/2013 | Naik | G10L 13/08 704/9 |
| 2013/0253903 A1 * | 9/2013 | Stephen | G06F 17/27 704/2 |
| 2014/0074470 A1 * | 3/2014 | Jansche | G10L 15/187 704/244 |
| 2014/0222415 A1 | 8/2014 | Legat | |
| 2014/0379709 A1 * | 12/2014 | Mack | G09B 19/04 707/732 |
| 2015/0249640 A1 | 9/2015 | Yacoub | |
| 2015/0269646 A1 | 9/2015 | Borges et al. | |
| 2016/0004748 A1 * | 1/2016 | Botchen | H04L 67/306 707/772 |
| 2016/0078859 A1 * | 3/2016 | Luan | G10L 13/033 704/260 |
| 2016/0093284 A1 | 3/2016 | Begum et al. | |
| 2016/0188727 A1 * | 6/2016 | Waibel | G09B 5/06 707/758 |
| 2016/0358596 A1 * | 12/2016 | Singh | G10L 13/08 |

OTHER PUBLICATIONS

Vincent Raemy et al., "Construction of Phonetic Representation of a String of Characters", U.S. Appl. No. 14/976,968, filed Dec. 21, 2015, pp. 1-37.

Vincent Raemy et al., "Construction of Phonetic Representation of a Generated String of Characters", U.S. Appl. No. 14/977,090, filed Dec. 21, 2015, pp. 1-42.

Vincent Raemy et al., "Method for Writing a Foreign Language in Pseudo Language Phonetically Resembling Native Language of the Speaker", U.S. Appl. No. 14/977,022, filed Dec. 21, 2015, pp. 1-48.

USPTO Notice of Allowance dated Oct. 20, 2016, U.S. Appl. No. 14/977,022, pp. 1-31.

USPTO Non-Final Office Action dated Oct. 20, 2016, U.S. Appl. No. 14/976,968, pp. 1-28.

USPTO Non-Final Office Action dated Oct. 20, 2016, U.S. Appl. No. 14/977,090, pp. 1-26.

Extended European Search Report dated May 17, 2017, European Application No. 16205843.2, pp. 1-8.

Extended European Search Report dated May 26, 2017, European Application No. 16205852.3, pp. 1-9.

Joong-Hoon Oh et al., "A Comparison of Different Machine Transliteration Models", Journal of Artificial Intelligence Research, vol. 27, 2006, pp. 119-151.

Walter Daelemans et al., "IGTree: Using Trees for Compression and Classification in Lazy Learning Algorithms", Artificial intelligence review vol. 11, No. 1-5, 1997, pp. 407-423.

Walter Daelemans et al., "Language-Independent Data-Oriented Grapheme-to-Phoneme Conversion", Progress in speech synthesis, Springer New York, 1997, pp. 77-89.

Sarvnaz Karimi et. al., "Machine Transliteration Survey", ACM Computing Surveys, vol. 43, No. 3, Article 17, Apr. 2011, pp. 1-46.

Amalia Zahra et al., "English to Indonesian Transliteration to Support English Pronunciation Practice", Proceedings of the Eighth International Conference on Language Resources and Evaluation, May 1, 2012, pp. 4132-4135.

Extended European Search Report dated May 10, 2017, European Application No. 16205824.2, pp. 1-8.

Braga et al., "Mashing Up Search Services," IEEE Internet Computing, 1089-7801/08, vol. 12, Issue 5, Sep./Oct. 2008, IEEE Computer Society, ISDN: 978-3-540-26918, pp. 16-23.

(56) References Cited

OTHER PUBLICATIONS

Heather Crawford et al., "Kwyjibo: automatic domain name generation", Software Practice and Experience, vol. 38, No. 14, 2008, pp. 1561-1567.
Anonymous, "n-gram", from Wikipedia—the free encyclopedia, Retrieved from the internet on Jul. 28, 2015: https://en.wikipedia.org/w/index.php?title=N-gram&oldid=583934400, pp. 1-6.
Extended European Search Report dated Aug. 4, 2015, European Application No. 15159846.3, pp. 1-9.
Chmielowiec et al., "Technical Challenges in Market-Driven Automated Service Provisioning," MW4SOC '08, Dec. 1, 2008, Leuven, Belgium, 6 pages.

\* cited by examiner

SYSTEMS AND METHODS FOR AUTOMATIC PHONETIZATION OF DOMAIN NAMES

FIELD

The present disclosure generally relates to the field of domain names.

BACKGROUND

The Internet enables a user of a client computer system to identify and communicate with millions of other computer systems located around the world. A client computer system may identify each of these other computer systems using a unique numeric identifier for that computer called an Internet Protocol ("IP") address. When a communication is sent from a client computer system to a destination computer system, the client computer system may specify the IP address of the destination computer system in order to facilitate the routing of the communication to the destination computer system. For example, when a request for a website is sent from a browser to a web server over the Internet, the browser may ultimately address the request to the IP address of the server. IP addresses may be a series of numbers separated by periods and may be hard for users to remember.

The Domain Name System (DNS) has been developed to make it easier for users to remember the addresses of computers on the Internet. DNS resolves a unique alphanumeric domain name that is associated with a destination computer into the IP address for that computer. Thus, a user who wants to visit the Verisign website need only remember the domain name "versign.com" rather than having to remember the Verisign web server IP address, such as 65.205.249.60.

A new domain name may be registered by a user through a domain name registrar. The user may submit to the registrar a request that specifies the desired domain name. The registrar may consult a central registry that maintains an authoritative database of registered domain names to determine if a domain name requested by a user is available for registration, or if it has been registered by another. If the domain name has not been registered, the registrar may indicate to the user that the requested domain is available for registration. The user may submit registration information and a registration request to the registrar, which may cause the domain to be registered for the user at the registry. If the domain is already registered, the registrar may inform the user that the domain is not available.

Many domain names have already been registered and are no longer available. Thus, a user may have to think of other domain names that may be suitable for the user's purpose. Additionally, when registering domain name or searching domain names, a user may desire to know the pronunciation of the domain name.

SUMMARY

Implementations of the present disclosure are directed to a method. The method can include receiving, from a user, a string of characters. The method can also include determining components of the string of characters. The components of the string of characters may include one or more graphemes that are related in the string of characters. The method can include determining universal phonetic representations for the components of the string of characters. The method can also include determining pronunciations for the universal phonetic representations. Additionally, the method can include constructing a pronunciation of the string of characters based at least partially on the pronunciations of the universal phonetic representations. Further, the method can include sending, to the user, a sound file representing the pronunciation of the string of characters.

In some implementations, the method can further include receiving, from the user, an indication that at least a portion of the pronunciation of the string of characters is incorrect. The method can include receiving, from the user, a custom pronunciation for at least one of the universal phonetic representations. Additionally, the method can include constructing a new pronunciation of the string of characters based at least partially on the pronunciations for the universal phonetic representations and the custom pronunciation for the at least one of the universal phonetic representations. The method can also include sending, to the user, a new sound file representing the new pronunciation of the string of characters.

In some implementations, determining pronunciations for the universal phonetic representations can include determining that at least one pronunciation does not exist for at least one of the universal phonetic representations. The method can also include receiving, from the user, a custom pronunciation for at least one of the universal phonetic representations. Further, the method can include constructing a new pronunciation of the string of characters based at least partially on the pronunciations for the universal phonetic representations and the custom pronunciation for the at least one of the universal phonetic representations. Additionally, the method can include sending, to the user, a new sound file representing the new pronunciation of the string of characters.

In some implementations, determining universal phonetic representations for the components of the string of characters can include accessing a first data structure that maps the components of the string of characters to the universal phonetic representations based on an international phonetic alphabet. The first data structure can include a plurality of first nodes with each first node of the plurality of first nodes having a respective weight assigned that corresponds to a pronunciation of a universal phonetic representation. The method can also include determining the universal phonetic representations for the components of the string of characters based on the first data structure.

In some implementations, the string of characters can correspond to a domain name.

In some implementations, the method can further include registering the string of characters as the domain name. The method can also include associating the sound file with the domain name.

In some implementations, constructing a pronunciation of the string of characters based at least partially on the pronunciations of the universal phonetic representations can include combining sound files for pronunciations for the universal phonetic representations.

Implementations of the present disclosure are also directed to a system. The system can include a memory storing instructions and at least one processor, operably coupled to the memory, implemented at least in part in hardware, and configured to execute the instructions to perform a method. The method can include receiving, from a user, a string of characters. The method can also include determining components of the string of characters. The components of the string of characters may include one or more graphemes that are related in the string of characters. The method can include determining universal phonetic representations for the components of the string of characters. The method can also include determining pronunciations for the universal phonetic representations. Additionally, the method can include constructing a pronunciation of the string of characters based at least partially on the pronunciations of the universal phonetic representations. Further, the method can include sending, to the user, a sound file representing the pronunciation of the string of characters.

Implementations of the present disclosure are also directed to a non-transitory computer-readable medium. The non-transitory computer-readable medium can include instructions which, when executed by at least one processor, cause the at least one processor to perform a method. The method can include receiving, from a user, a string of characters. The method can also include determining components of the string of characters. The components of the string of characters may include one or more graphemes that are related in the string of characters. The method can include determining universal phonetic representations for the components of the string of characters. The method can also include determining pronunciations for the universal phonetic representations. Additionally, the method can include constructing a pronunciation of the string of characters based at least partially on the pronunciations of the universal phonetic representations. Further, the method can include sending, to the user, a sound file representing the pronunciation of the string of characters.

It is to be understood that both the foregoing general description and the following detailed description are exemplary and explanatory only and are not restrictive of the disclosure, as claimed.

BRIEF DESCRIPTION OF THE DRAWINGS

The drawings are not necessarily to scale. Instead, emphasis is generally placed upon illustrating the principles of the disclosures described herein. The accompanying drawings, which are incorporated in and constitute a part of this specification, illustrate several implementations consistent with the disclosures and together with the description, serve to explain the principles of the disclosures. In the drawings.

DETAILED DESCRIPTION

Figure 1:
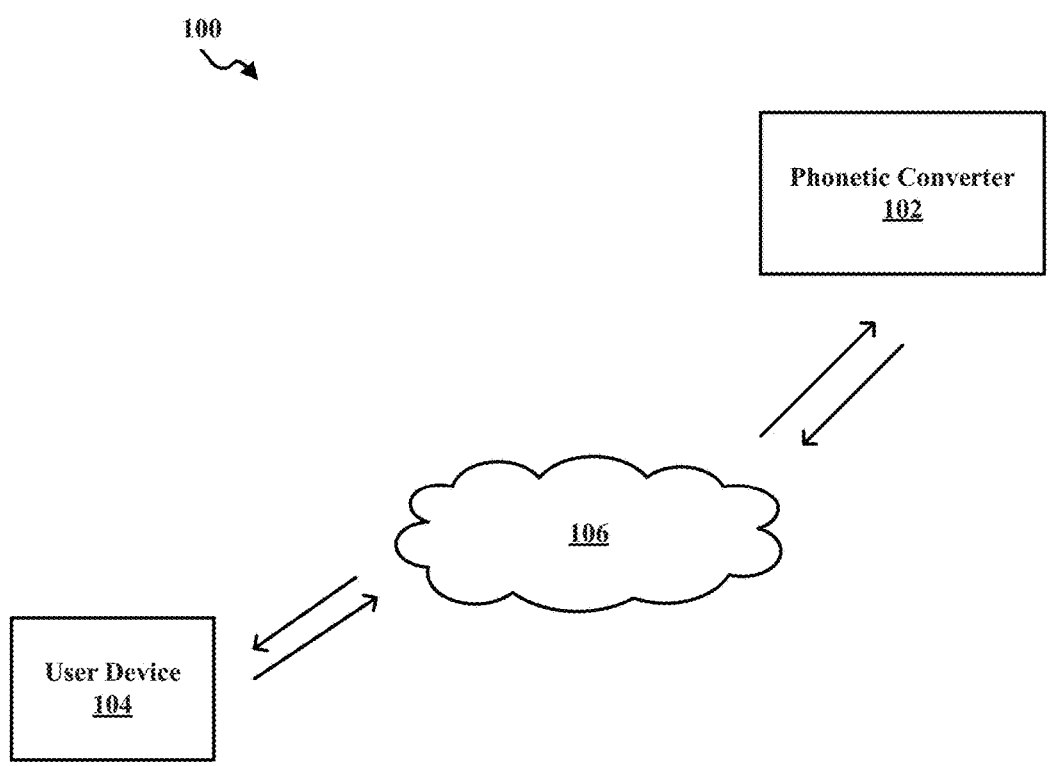
FIG. 1 shows an example of a system for providing a pronunciation of a string of characters, according to implementations.

The following detailed description refers to the accompanying drawings. Wherever possible, the same reference numbers are used in the drawings and the following description to refer to the same or similar parts. Also, similarly-named elements perform similar functions and are similarly designed, unless specified otherwise. Numerous details are set forth to provide an understanding of the implementations described herein. The implementations may be practiced without these details. In other instances, well-known methods, procedures, and components have not been described in detail to avoid obscuring the implementations described. While several exemplary implementations and features are described herein, modifications, adaptations, and other implementations are possible, without departing from the spirit and scope of the disclosure. Accordingly, the following detailed description does not limit the disclosure. Instead, the proper scope of the disclosure is defined by the appended claims.

As noted above many domain names have already been registered and are no longer available. Thus, a user may have to submit several domain name registration requests before finding a domain name that is available. There may be suitable alternative domain names that are unregistered and available, although a user may be unaware that they exist. Additionally, a user may desire to know the pronunciation of a domain name. For example, when registering a domain name, a user may desire to know the pronunciation of the domain name or customize the pronunciation before registering the domain name. Likewise, when requesting or resolving a domain name, a user may desire to know the pronunciation of the domain name. Additionally, when search or researching a particular domain name or other string of characters, a user may desire to know the pronunciation of the domain name or string of characters. An effective system is needed for providing a pronunciation of character strings, for example, domain names submitted by a user.

FIG. 1 illustrates an example of a system 100, according to various implementations. While FIG. 1 illustrates various components contained in the system 100, FIG. 1 illustrates one example of a system, which can be used in the processes described herein, and additional components can be added and existing components can be removed.

As illustrated in FIG. 1, the system 100 can include a phonetic converter 102. The phonetic converter 102 can be configured to receive one or more strings of characters and determine a pronunciation for the string of characters. To determine the pronunciation, the phonetic converter 102 can be configured to determine the components of the string of characters and generate phonetic representations for the components of the string of characters. Based on the phonetic representations, the phonetic converter 102 can be configured to determine the pronunciation of the phonetic representations. The phonetic converter 102 can then construct a pronunciation of the string of characters from the pronunciation of the phonetic representations. The phonetic converter 102 can also be configured to allow a user to customize the pronunciation of the string of characters.

The phonetic converter 102 can communicate with one or more user devices 104 via a network 106. The user device 104 can be any type of computing device that can communicate with the phonetic converter 102 via the network 106. For example, the user device 104 can be any type of conventional computing system, such as desktop, laptop, server, etc., or mobile device, such as a smart telephone, tablet computer, cellular telephone, personal digital assistant, etc. The user device 104 can include hardware resources, such as processors, memory, network hardware, storage devices, and the like, and software resources, such as operating systems (OS), application programs, and the like. The network 106 can be any type of communications networks, whether wired or wireless, to allow the computing system to communicate, such as wide-area networks or local-area networks. For example, the network 106 can include the Internet.

To provide the string of characters to the phonetic converter 102, the user of the user device 104 can enter the string of characters on an input device of the user device 104. For example, the user can enter the string of characters on a keyboard, keypad, touch screen, and the like. Likewise, to receive and review the pronunciation of the string of characters, the user device 104 can include one or more output devices, for example, a speaker to audibly present the pronunciation. Additionally, the user device 104 can include one or more input devices that allow a user to provide pronunciations to the phonetic converter 102.

The phonetic converter 102 can be implemented in any type of system. For example, the phonetic converter 102 can be a standalone computer system that provides pronunciations for strings of characters. Likewise, the phonetic converter 102 can be a part of or communication with another computer system. For example, the phonetic converter 102 can be part of or communication with a domain name registry or domain name registrar. In this example, the phonetic converter 102 can assist in the registration of domain names, the resolution of domain names, and the like. In another example, the phonetic converter 102 can be part of or communication with a search engine.

Figure 2:
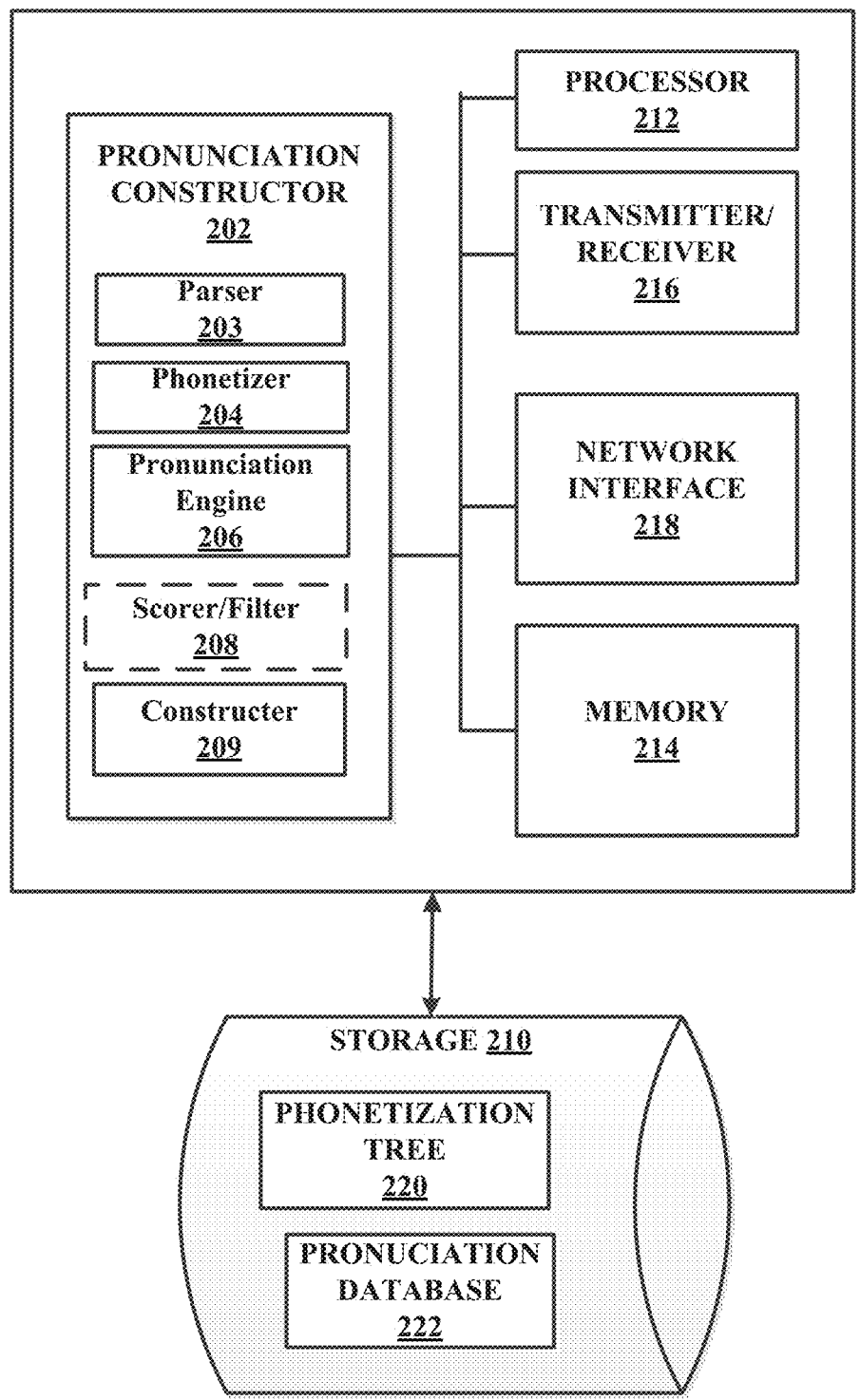
FIG. 2 shows an example of a phonetic converter, according to implementations.

FIG. 2 illustrates an example of a phonetic converter 102, according to various implementations. While FIG. 2 illustrates various components contained in the phonetic converter 102, FIG. 2 illustrates one example of a phonetic converter, which can be used in the processes described herein, and additional components can be added and existing components can be removed.

As shown in FIG. 2, the phonetic converter 102 can include a pronunciation constructor 202 to determine and generate a pronunciation of one or more strings of characters. The pronunciation constructor 202 can include a parser 203. The parser 203 can be configured to receive and parse one or more strings of characters. For example, one or more strings of characters can be received and can represent a domain name that a user is interested in registering as a domain name or a domain name attempting to be resolved. The parser 203 can be configured to parse the string of characters into one or more components. The components of the string of characters can be one or more individual graphemes that form meaningful linguistic portions ("tokens") of the string of characters. The tokens can include any number of graphemes from the string of characters that are pronounced together in the string of characters.

For example, the word "mckinney" can be parsed into the components m_c/k/i/n_n/e_y. In this example, one component can be the sequence of graphemes "ey." The two graphemes form one component of the word and can correspond to the phoneme "i." To parse the string of characters, the parser 203 can utilize a dictionary or linguistic maps for different languages. The dictionary or linguistic maps can define one or more individual graphemes that are commonly utilize together in speech.

For most languages, the parsing of the string of characters can be straightforward. However, there are some subtleties in some languages that use non-Latin characters that can make them more difficult to work with. For example, for Arabic, a diaphone/sub-syllable method can be used where the particular syllabic structure of Arabic words can be exploited. Arabic may be written without vowels that are nonetheless pronounced. Therefore, those missing vowels can be added to the string of characters before phonetic analysis. This can be done using a variety of approaches, including using a rule-based approach to handle vowelization of text where generic vowels are inserted into large dataset and trained with generic vowels. Other approaches include using a full morphological tagging procedure to perform automatic Arabic diacritization where a simple lexeme language model is used. For Chinese the use of polyphonic characters can be addressed during phonetization. For example, one approach for grapheme-to-phoneme conversion, in any language, can include the following steps: the text is segmented in words and then two methods are used, hand-crafted rules and statistical decision lists. A stochastic decision based on an Extended Stochastic Complexity (ESC) can be used to perform grapheme-to-phoneme conversion on Chinese.

The pronunciation constructor 202 can further includes phonetizer 204. The phonetizer 204 can be configured to access a data structure, for example, phonetization tree 220 in storage 210, that maps the components of a string of characters, e.g. graphemes, to one or more phonetic representations based on a phonetic alphabet, for example, mapping graphemes to one or more universal phonetic representations based on an international phonetic alphabet, as more fully discussed below. The data structure can include a plurality of first nodes with each first node of the plurality of first nodes having a respective weight assigned that corresponds to a likely pronunciation of a grapheme, as more fully discussed above. The phonetizer 204 can be further configured to determine one or more phonetic representations for one or more graphemes in the string of graphemes based on the first data structure, as more fully discussed below.

The pronunciation constructor 202 can further include a pronunciation engine 206. The pronunciation engine 206 may be configured to access a data structure, for example, a pronunciation database 222 in storage 210, that maps the one or more universal phonetic representations to a pronunciation of the one or more universal phonetic representations. For example, the pronunciation database 222 can include the one or more universal phonetic representations that are indexed with sound files for the pronunciation of the one or more universal phonetic representations. The pronunciation database 222 can include the pronunciation, in multiple languages, of the universal phonetic representations. The pronunciation engine 206 can be configured to search the pronunciation database 222 to locate the pronunciation of the one or more universal phonetic representations.

The pronunciation constructor 202 can optionally include a scorer/filter 208. Scorer/filter 208 can be configured to rank each grapheme representation to produce a rank list, wherein the ranking is based on a likelihood that a grapheme representation sounds similar to a pronunciation sound of the string of characters, and filter the ranked list to produce a subset of graphene representations, as more fully discussed above.

The pronunciation constructor 202 can include a constructor 209. The constructor 209 can be configured to construct the pronunciation of the string of characters based on the pronunciation, e.g. sound files, of the universal phonetic representations, in other words, the components of the string of characters.

The phonetic converter 102 can further include a processor 212 to execute machine-readable code in the form of program instructions to perform the functionality discussed with regard to the pronunciation constructor 202, the parser 203, the phonetizer 204, the pronunciation engine 206, the scorer/filter 208 and the constructor 209, in additional to the methods and functionality as discussed herein. The phonetic converter 102 can further include a transmitter/receiver 216 to transmit and receive data from other devices within a networked, computing system environment. The phonetic converter 102 can further include network interface 218 to facilitate communication with other devices, for example, the user device 104, within a networked, computing system environment.

The phonetic converter 102 can further include a memory 214. The memory 214 can be any device capable of storing electronic information, such as RAM, flash memory, a hard disk, an internal or external database, etc. The memory 214 can be implemented as a non-transitory storage medium to store instructions adapted to be executed by the processor(s) to perform at least part of the method in accordance with certain implementations. For example, the memory can store computer program instructions, for example, computer-readable or machine-readable instructions, adapted to be executed on the processor(s), to perform the processes of the pronunciation constructor 202.

Figure 3:
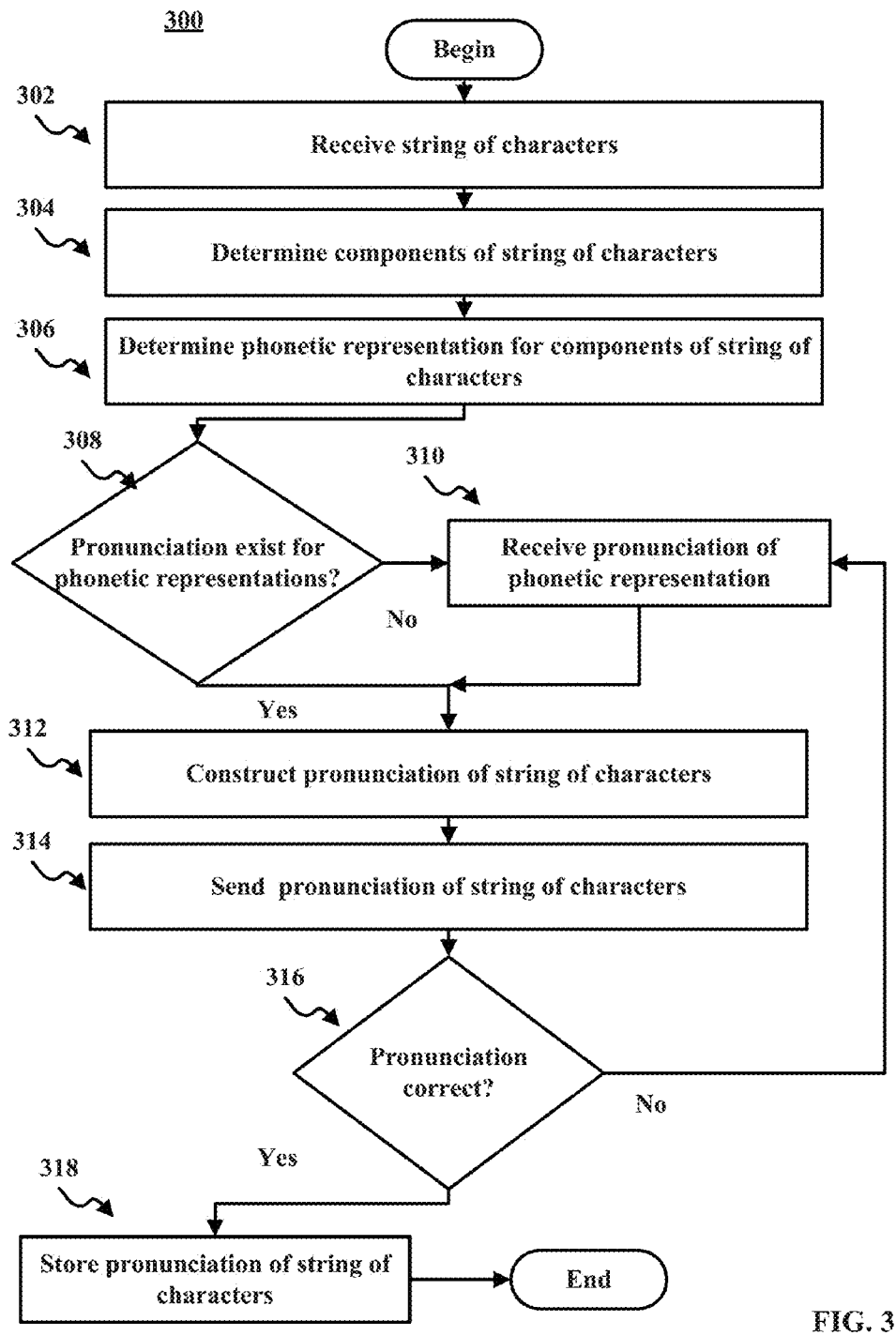
FIG. 3 shows an example of a method for determining the pronunciation of a string of characters, according to implementations.

FIG. 3 illustrates an example of a method 300 of generating a pronunciation of a string of characters, according to various implementations. The illustrated stages of the method are examples and that any of the illustrated stages can be removed, additional stages can be added, and the order of the illustrated stages can be changed.

After the method begins, in 302, a string of characters can be received. For example, the phonetic converter 102 can receive a string of characters from the user device 104. The string of characters can be input via a user interface of the user device 104. For example, the user device 104 can be a mobile device, such as a smart phone with a touch screen that can be used to receive input from the user. Likewise, for example, the user device 104 can be a laptop or desktop computer with a keyboard that can be used to receive input from the user. Likewise, for example, one or more programs or software on the user device 104 may send the string of characters to the phonetic converter 102. For instance, a speech program, e.g. Siri© by Apple Corporation©, on the user device 104 may require the pronunciation of a string of characters for presentation to a user and can send the string of characters to the phonetic converter 102.

In implementations, the string of characters can be any string of character that requires pronunciation. In some implementations, the string of characters can represent a domain name that a user of the user device 104 is interested in registering as a domain name. In some implementations, the string of characters can be a search string entered on the user device 104. In some implementations, the string of characters can represent a domain name being resolved by the user device 104.

In 304, components of the string of characters can be determined. For example, the phonetic converter 102 can determine the components of the string of characters. The components of the string of characters can be one or more individual graphemes that form meaningful linguistic portions ("tokens") of the string of characters. The tokens can include any number of graphemes from the string of characters that are pronounced together in the word. In some implementations, for example, the parser 203 of the phonetic converter 102 can parse the string of characters using any means to identify the components of the string of characters.

In 306, a phonetic representation for the components of the string of characters can be determined. In some implementations, for example, the phonetizer 204 of the phonetic converter 102 can access a data structure, for example, the phonetization tree 220 in storage 210, that maps the components of a string of characters, e.g. graphemes, to one or more phonetic representations based on a phonetic alphabet, for example, mapping graphemes to one or more universal phonetic representations based on an international phonetic alphabet, as more fully discussed below. The data structure can include a plurality of first nodes with each first node of the plurality of first nodes having a respective weight assigned that corresponds to a likely pronunciation of a grapheme, as more fully discussed above. The phonetizer 204 can determine one or more phonetic representations for one or more graphemes in the string of graphemes based on the first data structure, as more fully discussed with reference to FIGS. 4, 5, and 6.

In 308, it can be determined whether a pronunciation exists for the phonetic representations. In some implementations, for example, the pronunciation engine 206 of the phonetic converter 102 can access a data structure, for example, the pronunciation database 222 in storage 210, that maps the one or more universal phonetic representations to a pronunciation of the one or more universal phonetic representations. For example, the pronunciation database 222 can include the one or more universal phonetic representations that are indexed with sound files for the pronunciation of the one or more universal phonetic representations. The pronunciation database 222 can include the pronunciation, in multiple languages, of the universal phonetic representations. The pronunciation engine 206 can search the pronunciation database 222 to locate the pronunciation of the one or more universal phonetic representations.

If a pronunciation does not exist for one or more of the phonetic representations, in 310, a pronunciation can be received for the phonetic representation. For example, one or more of the universal phonetic representations may not include a pronunciation or a universal phonetic representation may not exist. In some implementations, the phonetic converter 102 can request that the user device 104 provide a pronunciation for the phonetic representation that does not exist. For example, a user of the user device 104 can speak the pronunciation into an input device of the user device 104 such as a microphone. Once the pronunciation is received, the phonetic converter 102 can store the pronunciation, provided by the user, in the pronunciation database 222.

If pronunciations exists for the phonetic representations (or the user provides one or more pronunciations), in 312, a pronunciation can be constructed for the string of characters. In some implementations, for example, the constructor 209 of the phonetic converter 102 can construct the pronunciation of the string of characters based on the pronunciation, e.g. sound files, of the universal phonetic representations, in other words, the components of the string of characters. The constructor 209 can combine the phonetic representations located in the pronunciation database 222 and any provided by the user to form a sound file that represents the pronunciation of the string of characters.

In 314, the pronunciation of the string of characters can be sent. In some implementations, for example, the phonetic converter 102 may transmit a sound file representing the pronunciation of the string of characters. The phonetic converter 102 may transmit the sound file via the network 106 to the user device 104.

In 316, it can be determined if the pronunciation is correct. In some implementations, for example, a user of the user device 104 may listen to the sound file and determine if the pronunciation is correct.

If the pronunciation is not correct, the method 300 can return to 310. For example, the user of the user device 104 may determine that the pronunciation (or a portion of the pronunciation) of the string of characters is incorrect. Returning to 310, the phonetic converter 102 can request that the user device provide a new pronunciation for the string of characters or a portion of the string of characters.

If the pronunciation is correct, in 318, the pronunciation of the string of characters can be stored. In some implementations, for example, the pronunciation of the string of characters may be stored for use in other applications. For example, if the string of characters is associated with a domain name, the pronunciation, e.g. sound file, can be stored at the phonetic converter 102 or other system, e.g. registry, and linked to the domain name. If the domain name is requested or searched, the sound file can be provided with an answer to a domain name request or search.

The method 300 can then end, repeat, or return to any point.

Figure 4:
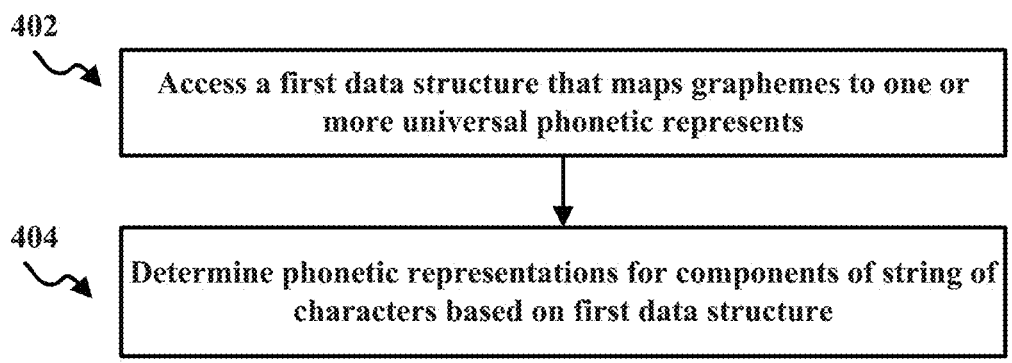
FIG. 4 shows an example method for converting a string of characters in a first language into a phonetic representation, according to implementations.

FIG. 4 shows an example method for converting a string of characters into one or more phonetic representations of the string of characters, according to implementations.

In 404, a first data structure that maps graphemes to one or more universal phonetic representations based on an international phonetic alphabet can be accessed. In some implementations, for example, The first data structure can comprise a plurality of first nodes with each first node of the plurality of first nodes having a respective weight assigned that corresponds to a likely pronunciation of a grapheme. A grapheme-to-phoneme (g2p) mapper can transform a particular input letter into its corresponding sound based on the correct context, a process called phonemization, which can be performed using a variety of techniques. For example, one technique can use of phonological rules, where these rules are based on the knowledge of the system developer. Generally, these rules can include the left and right context of the grapheme to assign it a phoneme. For instance, A/X/B→y means that X can be phonetized as the sound y when it is between A and B. Another technique can use a dictionary-based technique where words are provided with their corresponding phoneme sequence; however, this technique could have difficulty with Out-Of-Vocabulary (OOV) items that may be found in company names, proper names, and invented names. Another technique can use data-driven techniques that can learn directly the rules from a phonetic dictionary. In this case, small amount of manual work may be performed when a dictionary is available. There are many techniques that can be used for this conversion, including using statistical models to learn data-driven representations of the data, using machine learning algorithms, such as decision trees, pronunciation by analogy, neural networks, Hidden Markov Models (HMMs), information gain (IG) tree. In the IG tree approach, each level of the tree refines the context of the conversion where the deeper the tree, the more exact the conversion will be. The context includes letters to the left and right in the input word. The IG tree approach is language-independent. The g2p mapping of one letter is an efficient lookup in the tree. IG-tree requires some work to align source grapheme to destination phoneme, but this step can itself be automated using, for example, HMMs.

Figure 5:
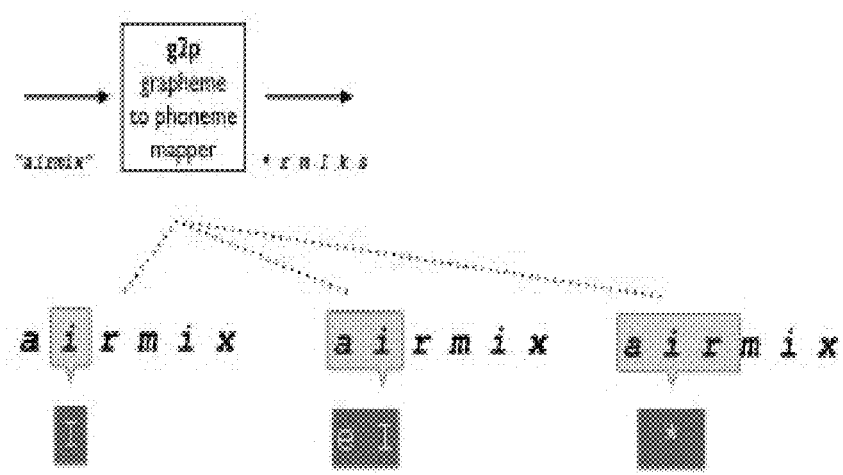
FIG. 5 shows an example of context utilization during phonetization, according to implementations.

FIG. 5 shows an example of context utilization during phonetization, according to implementations. When using no context or 1-left context, the "i" grapheme is mapped to the "I" phoneme. When 1-left and 1-right context is considered, the graphemes "air" should be taken together and can be represented by the phonetic symbol "*." As shown, the grapheme string "airmix" can be represented by the phonetic string "*rmIks" using the g2P grapheme to phoneme mapper. The depth of the tree is chosen by the training procedure. The deeper the tree will be, the more precise the results will be. On the other hand, deeper trees may require a larger size in memory and longer search time. After the creation of the tree is complete, its structure can be saved to storage, for example, in the phonetization tree 220, using any technique, for example, Java serialization.

When doing phonetization of graphemes, the context can be considered. FIG. 5 shows a phonetization example where the result changes based on how much context is included. An IG-Tree can give context-dependent answers. An IG-Tree is a tree data structure used to encode the context of a phonetization. Each node, except the root, has a key, indicating the search term. For the g2p mapper, the keys are graphemes and the values are phonemes. Each node has also a list of possible values and their likelihoods. Such a structure allows more or less context to be considered for the phonetization. Phonetization of grapheme may be dependent on its context. The IG-Tree considers the left and right graphemes of the current element as the context to use to distinguish between the possible phonetizations. The depth of the tree can indicate the size of the context that is taken into account. A search into the tree can be made in this manner. For a letter at the position i of the input word w, get the son of the root with the key w[i]. Then, as long as a node exists, you go down the tree. For odd levels, you get the letter to the left as the key and for even levels, you get the letter at the right as the key. Once there are no sons with the correct key, the final node is used as the result of the phonetic mapping. The search for one mapping is done in O(D) where D is the maximum depth of the tree. This depth is configured when training the tree and can be kept small for most languages, making a very fast search into the tree.

Figure 6:
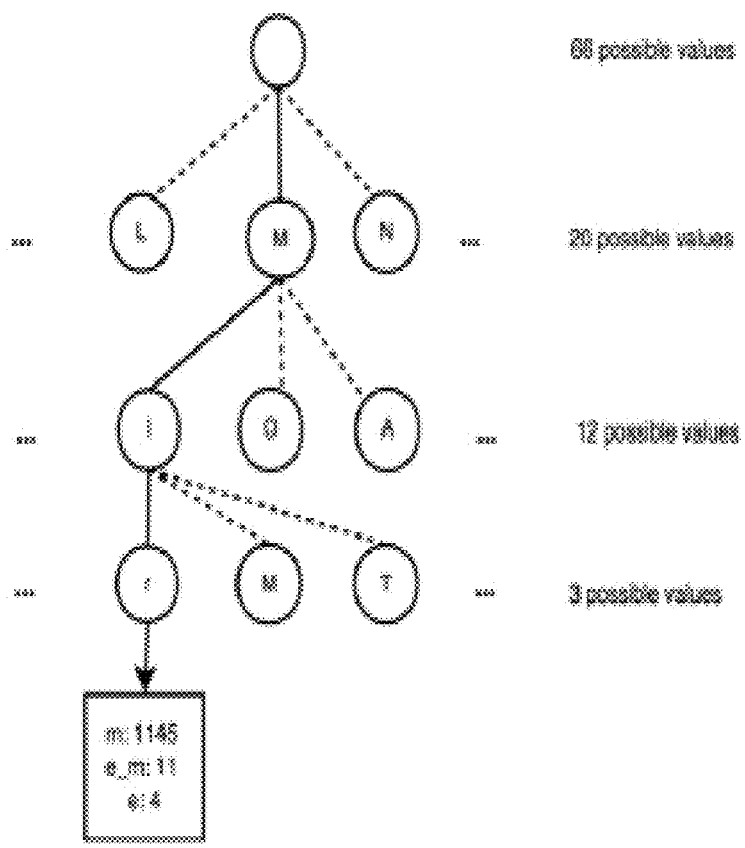
FIG. 6 shows an example of the use of an IG-Tree, according to implementations.

Continuing with FIG. 4, at 404, one or more phonetic representations for components of the string of characters can be determined based on the first data structure. As discussed above, the first data structure can be represented using an IG-Tree. FIG. 6 shows an example of the use of an IG-Tree, according to implementations. There can be two different ways to use the IG-Tree. For each way, the input sequence of grapheme can be aligned into its best possible phonetic alignment. The input word can be, in its simplest form, a sequence of single grapheme. However, some graphemes needs to be grouped together to form pseudo-graphemes. If only the best answer is necessary, the algorithm can be a sequence of tree traversal. For each grapheme (or pseudo-grapheme), only one single traversal of the tree may be necessary with the longest possible context (path in the tree). The resulting phoneme can be the most probable phoneme in the found node. The resulting phoneme sequence can be formed by the concatenation of the phonemes found previously. If the best answers are necessary, an N-Best algorithm can be used to find them. For that, an HMM can be built for the best possible phonemes at the final node in the tree path. The transition probabilities are set using grapheme bigram, gathered during the training. A discrete estimator can also be populated using the likelihoods of the phonemes at the final node in the tree path. Once these two components are created, an N-Best algorithm can be used to find the best paths.

As discussed above, in some instances, some graphemes can be grouped together in order to be mapped correctly to the phonemes. For instance, double consonants can be phonetized together. Therefore, one goal is to find the correct sequence of pseudo grapheme for the input sequence. In this implementation, a three-step process can be used: The first step is to generate all the possible permutations of the input sequence. This takes into account the list of the possible pseudo phonemes, learned during training. The second step can be to remove some bad possible observations, also called pruning. Rules can be used to detect bad sequence, especially by detecting pseudo graphemes which should not be put together. This process can use the bigram probabilities to avoid bad starting pseudo grapheme and bad ending pseudo grapheme. The third step can be to find the most probable sequence between the remaining permutations. Each sequence can be assigned a score that is the multiplication of each bigram probability inside the word. The permutation with the best score can then be kept.

The N-Best algorithm can be based on an HMM and a discrete estimator. All the possible paths inside the HMMs are created, letter by letter (from the input word). Each path can be assigned a score based on the discrete estimator. After each letter, they are pruned to improve computation time. The pruning process can be controlled with a pruning coefficient and a maximum number of nodes created. During the whole process, in each path, the worst and best scores can be kept up to date to improve pruning performances.

In some instances, missing phonemes should be considered. Even when using the same phonetic alphabet, there may be some differences between languages. From language to language, some symbols are bound to have different sounds. In other languages, some phonemes are simply missing. For example, the missing phonemes can be accounted for using the following technique. For each missing phoneme from language source to language target, the possible corresponding graphemes are searched in the language source. If there is a corresponding grapheme that is very probable ($P(g)>70$) or if the most probable grapheme is much more probable than the second ($P(first)>20+P(second)$), the corresponding phonemes of this grapheme are obtained in language target. Again, if there is a corresponding phoneme that is very probable ($P(p)>70$) or if the most probable phoneme is much more probable than the second ($P(first)>20+P(second)$), the source missing phoneme are mapped to the target found phoneme.

In some instances, acronyms should also be considered. Acronyms are not typically pronounced the same as normal words. They are typically pronounced by spelling letters independently. To handle this case, the g2p mapper can contain a small dictionary with the phonetization of each letter. A special parameter can be set indicating that the input is an acronym and must be phonetized as such. Additionally or alternatively, an IG-Tree can be trained on the phonetizations of acronyms.

Figure 7A:
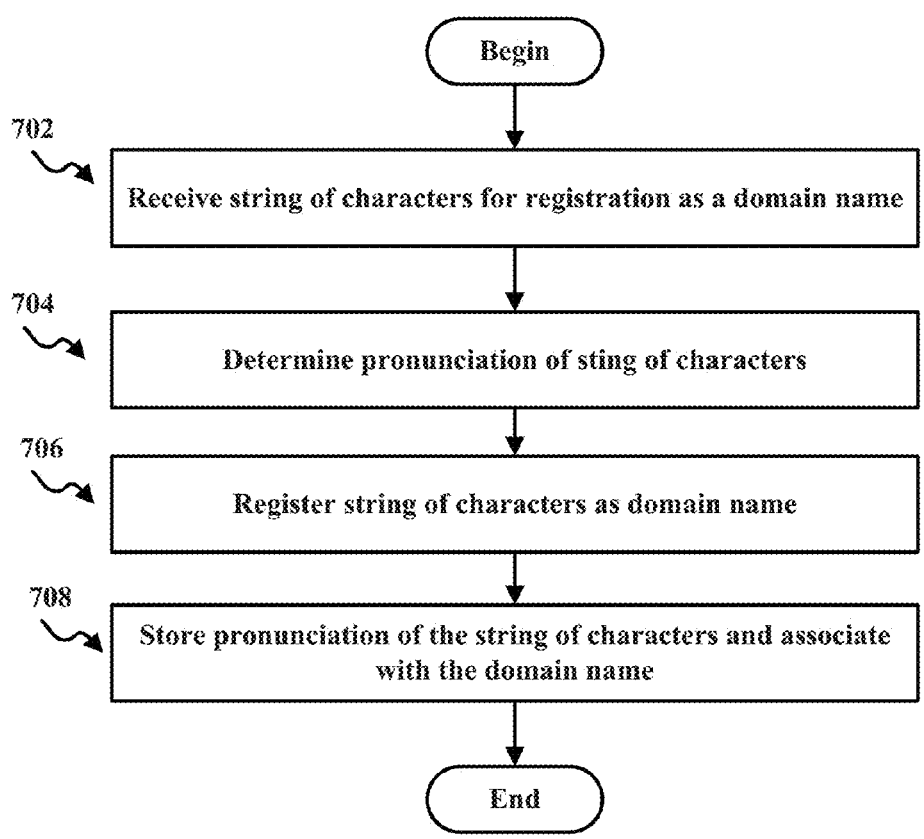
FIGS. 7A and 7B illustrate examples of applications of a pronunciation of a string of characters, according to various implementations.
Figure 7B:
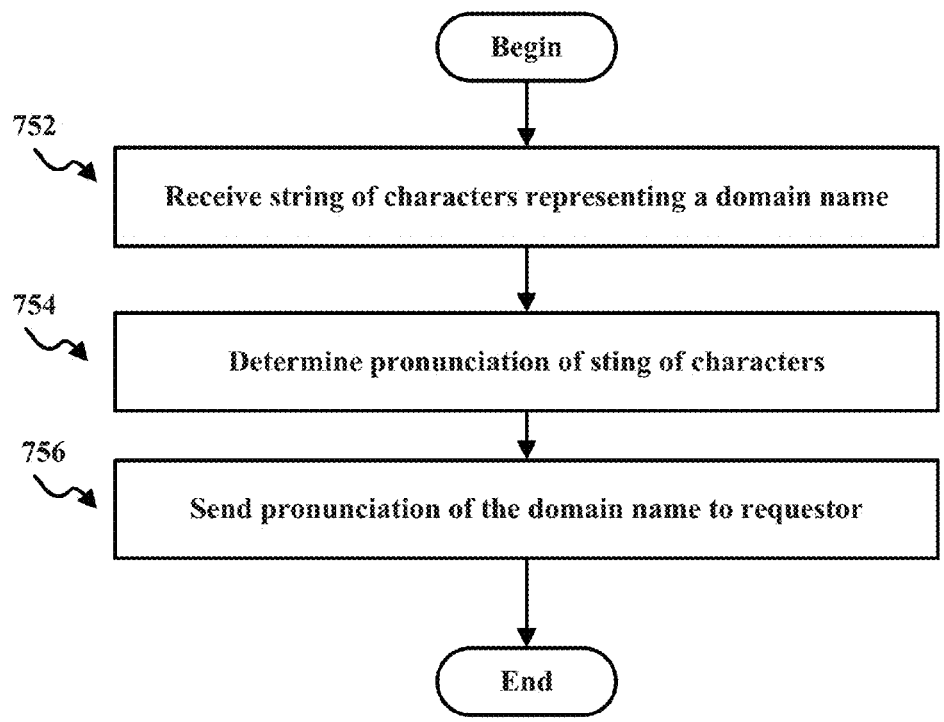

As discussed above, the pronunciation provided by the phonetic converter 102 may be applied to any number of applications. FIGS. 7A and 7B illustrate examples of applications of a pronunciation of a string of characters, according to various implementations. The illustrated stages of the method are examples and that any of the illustrated stages can be removed, additional stages can be added, and the order of the illustrated stages can be changed.

FIG. 7A illustrates an example of a method 700 for using the pronunciation in the domain name registration, according to implementations.

After the method begins, in 702, a string of characters for registration as a domain name can be received. For example, a user may desire the register a sting of characters as a domain name. The user may desire to determine the pronunciation prior to registration. In some implementations, for example, the phonetic converter 102 may be part of or operating with a registry or registrar. The user of the user device 104 may submit the string of characters for domain name registration.

In 704, the pronunciation of the string of characters can be determined. In some implementations, for example, the phonetic converter 102 can utilize the method 300 to determine the pronunciation.

In 706, the string of characters can be registered as a domain name. In implementations, for example, the phonetic converter 102 (or registry/registrar) can perform the conventional processes of domain registration. For example, the string of characters can be checked for availability. If available, the domain name record for the domain name can be created.

In 708, the pronunciation of the string of characters can be stored and associated with the domain name. In some implementations, for example, the pronunciation, e.g. the sound file, can be stored in the domain records. In some implementations, for example, a link or reference to the pronunciation, e.g. the sound file, can be stored in the domain records. Once the domain name is resolved or searched, the sound file can be provided.

The method 700 can then end, repeat, or return to any point.

FIG. 7B illustrates an example of a method 750 for providing the pronunciation in response to a domain name requests, according to implementations.

After the method begins, in 752, a string of characters representing a domain name can be received. For example, a user may request resolution of a domain name. Likewise, for example, the user may search for the domain name or perform other actions associated with the domain name. In some implementations, for example, the phonetic converter 102 may be part of or operating with a registry or registrar. The user of the user device 104 may submit the string of characters for domain name registration.

In 754, the pronunciation of the string of characters can be determined. In some implementations, for example, the phonetic converter 102 can utilize the method 300 to determine the pronunciation. In some implementations, for example, the pronunciation may have been previously generated and stored. In this example, the phonetic converter 102 (or registry/registrar) can retrieve the pronunciation.

In 756, the pronunciation of the domain name can be sent to the requestor. In some implementations, for example, the phonetic converter 102 (or registry/registrar) may transmit a sound file representing the pronunciation of the domain name. The phonetic converter 102 (or registry/registrar) may transmit the sound file via the network 106 to the user device 104.

The method 750 can then end, repeat, or return to any point.

The foregoing description is illustrative, and variations in configuration and implementation can occur to persons skilled in the art. For instance, the various illustrative logics, logical blocks, modules, and circuits described in connection with the implementations disclosed herein can be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor can be a microprocessor, but, in the alternative, the processor can be any conventional processor, controller, microcontroller, or state machine. A processor can also be implemented as a combination of computing devices, e.g., a combination of a DSP and a microprocessor, a plurality of microprocessors, one or more microprocessors in conjunction with a DSP core, or any other such configuration.

In one or more exemplary implementations, the functions described can be implemented in hardware, software, firmware, or any combination thereof. For a software implementation, the techniques described herein can be implemented with modules (e.g., procedures, functions, subprograms, programs, routines, subroutines, modules, software packages, classes, and so on) that perform the functions described herein. A module can be coupled to another module or a hardware circuit by passing and/or receiving information, data, arguments, parameters, or memory contents. Information, arguments, parameters, data, or the like can be passed, forwarded, or transmitted using any suitable means including memory sharing, message passing, token passing, network transmission, and the like. The software codes can be stored in memory units and executed by processors. The memory unit can be implemented within the processor or external to the processor, in which case it can be communicatively coupled to the processor via various means as is known in the art.

Figure 8:
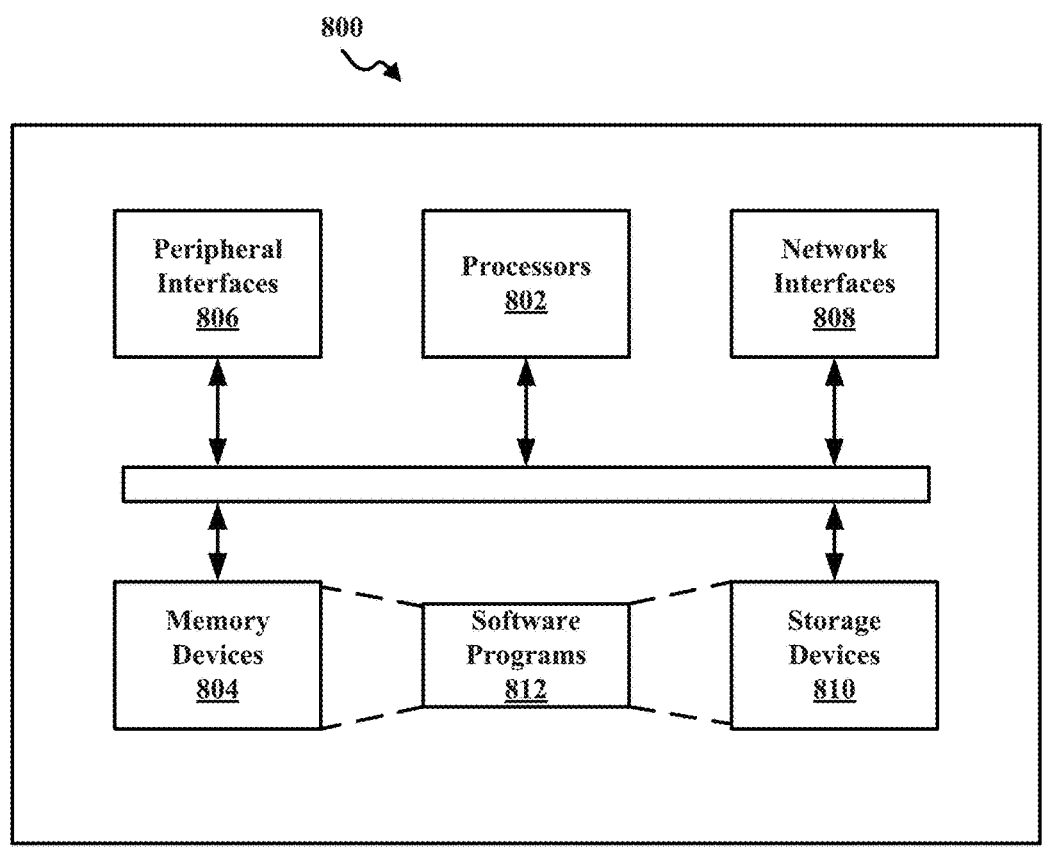
FIG. 8 shows an example computer system according to implementations.

For example, FIG. 8 illustrates an example of a hardware configuration for a computer device 800 that can be used as any device in the system 100, for example, the phonetic converter 102, the user device 104, etc., which can be used to perform one or more of the processes described above. While FIG. 8 illustrates various components contained in the computer device 800, FIG. 8 illustrates one example of a computer device and additional components can be added and existing components can be removed.

The computer device 800 can be any type of computer devices, such as desktops, laptops, servers, etc., or mobile devices, such as smart telephones, tablet computers, cellular telephones, personal digital assistants, etc. As illustrated in FIG. 8, the computer device 800 can include one or more processors 802 of varying core configurations and clock frequencies. The computer device 800 can also include one or more memory devices 804 that serve as a main memory during the operation of the computer device 800. For example, during operation, a copy of the software that supports the DNS operations can be stored in the one or more memory devices 804. The computer device 800 can also include one or more peripheral interfaces 806, such as keyboards, mice, touchpads, computer screens, touchscreens, etc., for enabling human interaction with and manipulation of the computer device 800.

The computer device 800 can also include one or more network interfaces 808 for communicating via one or more networks, such as Ethernet adapters, wireless transceivers, or serial network components, for communicating over wired or wireless media using protocols. The computer device 800 can also include one or more storage devices 810 of varying physical dimensions and storage capacities, such as flash drives, hard drives, random access memory, etc., for storing data, such as images, files, and program instructions for execution by the one or more processors 802.

Additionally, the computer device 800 can include one or more software programs 812 that enable the functionality described above. The one or more software programs 812 can include instructions that cause the one or more processors 802 to perform the processes described herein. Copies of the one or more software programs 812 can be stored in the one or more non-transitory computer-readable mediums such as memory devices 804 and/or on in the one or more storage devices 810. Likewise, the data, for example, DNS records, utilized by one or more software programs 812 can be stored in the one or more memory devices 804 and/or on in the one or more storage devices 810.

In implementations, the computer device 800 can communicate with other devices via one or more networks, for example, network 106. The other devices can be any types of devices as described above. The network can be any type of network, such as a local area network, a wide-area network, a virtual private network, the Internet, an intranet, an extranet, a public switched telephone network, an infrared network, a wireless network, and any combination thereof. The network 106 can support communications using any of a variety of commercially-available protocols, such as TCP/IP, UDP, OSI, FTP, UPnP, NFS, CIFS, AppleTalk, and the like. The network 106 can be, for example, a local area network, a wide-area network, a virtual private network, the Internet, an intranet, an extranet, a public switched telephone network, an infrared network, a wireless network, and any combination thereof.

The computer device 800 can include a variety of data stores and other memory and storage media as discussed above. These can reside in a variety of locations, such as on a storage medium local to (and/or resident in) one or more of the computers or remote from any or all of the computers across the network. In some implementations, information can reside in a storage-area network ("SAN") familiar to those skilled in the art. Similarly, any necessary files for performing the functions attributed to the computers, servers, or other network devices may be stored locally and/or remotely, as appropriate.

In implementations, the components of the computer device 800 as described above need not be enclosed within a single enclosure or even located in close proximity to one another. Those skilled in the art will appreciate that the above-described componentry are examples only, as the computer device 800 can include any type of hardware componentry, including any necessary accompanying firmware or software, for performing the disclosed implementations. The computer device 800 can also be implemented in part or in whole by electronic circuit components or processors, such as application-specific integrated circuits (ASICs) or field-programmable gate arrays (FPGAs).

If implemented in software, the functions can be stored on or transmitted over a computer-readable medium as one or more instructions or code. Computer-readable media includes both tangible, non-transitory computer storage media and communication media including any medium that facilitates transfer of a computer program from one place to another. A storage media can be any available tangible, non-transitory media that can be accessed by a computer. By way of example, and not limitation, such tangible, non-transitory computer-readable media can comprise RAM, ROM, flash memory, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes CD, laser disc, optical disc, DVD, floppy disk and Blu-ray disc where disks usually reproduce data magnetically, while discs reproduce data optically with lasers. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Combinations of the above should also be included within the scope of computer-readable media.

While the teachings have been described with reference to examples of the implementations thereof, those skilled in the art will be able to make various modifications to the described implementations without departing from the true spirit and scope. The terms and descriptions used herein are set forth by way of illustration only and are not meant as limitations. In particular, although the processes have been described by examples, the stages of the processes can be performed in a different order than illustrated or simultaneously. Furthermore, to the extent that the terms "including", "includes", "having", "has", "with", or variants thereof are used in the detailed description, such terms are intended to be inclusive in a manner similar to the term "comprising." As used herein, the terms "one or more of" and "at least one of" with respect to a listing of items such as, for example, A and B, means A alone, B alone, or A and B. Further, unless specified otherwise, the term "set" should be interpreted as "one or more." Also, the term "couple" or "couples" is intended to mean either an indirect or direct connection. Thus, if a first device couples to a second device, that connection can be through a direct connection, or through an indirect connection via other devices, components, and connections.

Those skilled in the art will be able to make various modifications to the described implementations without departing from the true spirit and scope. The terms and descriptions used herein are set forth by way of illustration only and are not meant as limitations. In particular, although the method has been described by examples, the steps of the method can be performed in a different order than illustrated or simultaneously. Those skilled in the art will recognize that these and other variations are possible within the spirit and scope as defined in the following claims and their equivalents.

The foregoing description of the disclosure, along with its associated implementations, has been presented for purposes of illustration only. It is not exhaustive and does not limit the disclosure to the precise form disclosed. Those skilled in the art will appreciate from the foregoing description that modifications and variations are possible in light of the above teachings or may be acquired from practicing the disclosure. For example, the steps described need not be performed in the same sequence discussed or with the same degree of separation. Likewise various steps may be omitted, repeated, or combined, as necessary, to achieve the same or similar objectives. Similarly, the systems described need not necessarily include all parts described in the implementations, and may also include other parts not describe in the implementations.

Accordingly, the disclosure is not limited to the above-described implementations, but instead is defined by the appended claims in light of their full scope of equivalents.

The invention claimed is:

1. A method, comprising:
   receiving, from a user, a string of characters;
   determining components of the string of characters, wherein the components of the string of characters comprise one or more graphemes that are related in the string of characters;
   determining universal phonetic representations for the components of the string of characters;
   determining pronunciations for the universal phonetic representations;
   constructing a pronunciation of the string of characters based at least partially on the pronunciations of the universal phonetic representations;
   sending, to the user, a sound file representing the pronunciation of the string of characters;
   receiving a user sound file created by the user using a microphone, the user sound file representing a custom pronunciation associated with a subset of the universal phonetic representations corresponding to a portion of the pronunciation of the string of characters;
   constructing a new pronunciation of the string of characters based at least partially on the pronunciations for the universal phonetic representations and the custom pronunciation associated with the subset of the universal phonetic representations; and
   sending, to the user, a new sound file representing the new pronunciation of the string of characters, wherein the new sound file comprises a combination of a portion of the sound file representing the pronunciation of the string of characters and the user sound file.

2. The method of claim 1, the method further comprising:
   in response to sending the sound file, receiving, from the user, an indication that at least the portion of the pronunciation of the string of characters is incorrect.

3. The method of claim 1, wherein determining pronunciations for the universal phonetic representations, comprises:
   determining that at least one pronunciation does not exist for at least one of the universal phonetic representations;
   receiving, from the user, a custom pronunciation for at least one of the universal phonetic representations;
   constructing a second new pronunciation of the string of characters based at least partially on the pronunciations for the universal phonetic representations and the custom pronunciation for the at least one of the universal phonetic representations; and
   sending, to the user, a second new sound file representing the new second pronunciation of the string of characters.

4. The method of claim 1, wherein determining universal phonetic representations for the components of the string of characters, comprises:
   accessing a first data structure that maps the components of the string of characters to the universal phonetic representations based on an international phonetic alphabet, wherein the first data structure comprises a plurality of first nodes with each first node of the plurality of first nodes having a respective weight assigned that corresponds to a pronunciation of a universal phonetic representation; and
   determining the universal phonetic representations for the components of the string of characters based on the first data structure.

5. The method of claim 1, wherein the string of characters corresponds to a domain name.

6. The method of claim 5, the method further comprising:
   registering the string of characters as the domain name; and
   associating the new sound file with the domain name.

7. The method of claim 1, wherein constructing a pronunciation of the string of characters based at least partially on the pronunciations of the universal phonetic representations, comprises:

combining sound files for pronunciations for the universal phonetic representations.

8. A system, comprising:
a memory storing instructions; and
at least one processor, operably coupled to the memory, implemented at least in part in hardware, and configured to execute the instructions to perform a method comprising:
receiving, from a user, a string of characters;
determining components of the string of characters, wherein the components of the string of characters comprise one or more graphemes that are related in the string of characters;
determining universal phonetic representations for the components of the string of characters;
determining pronunciations for the universal phonetic representations;
constructing a pronunciation of the string of characters based at least partially on the pronunciations of the universal phonetic representations;
sending, to the user, a sound file representing the pronunciation of the string of characters;
receiving a user sound file created by the user using a microphone, the user sound file representing a custom pronunciation associated with a subset of the universal phonetic representations corresponding to a portion of the pronunciation of the string of characters;
constructing a new pronunciation of the string of characters based at least partially on the pronunciations for the universal phonetic representations and the custom pronunciation associated with the subset of the universal phonetic representations; and
sending, to the user, a new sound file representing the new pronunciation of the string of characters, wherein the new sound file comprises a combination of a portion of the sound file representing the pronunciation of the string of characters and the user sound file.

9. The system of claim 8, wherein the at least one processor is configured to execute the instructions to perform the method further comprising:
in response to sending the sound file, receiving, from the user, an indication that at least the portion of the pronunciation of the string of characters is incorrect.

10. The system of claim 8, wherein determining pronunciations for the universal phonetic representations, comprises:
determining that at least one pronunciation does not exist for at least one of the universal phonetic representations;
receiving, from the user, a custom pronunciation for at least one of the universal phonetic representations;
constructing a second new pronunciation of the string of characters based at least partially on the pronunciations for the universal phonetic representations and the custom pronunciation for the at least one of the universal phonetic representations; and
sending, to the user, a second new sound file representing the second new pronunciation of the string of characters.

11. The system of claim 8, wherein determining universal phonetic representations for the components of the string of characters, comprises:
accessing a first data structure that maps the components of the string of characters to the universal phonetic representations based on an international phonetic alphabet, wherein the first data structure comprises a plurality of first nodes with each first node of the plurality of first nodes having a respective weight assigned that corresponds to a pronunciation of a universal phonetic representation; and
determining the universal phonetic representations for the components of the string of characters based on the first data structure.

12. The system of claim 8, wherein the string of characters corresponds to a domain name.

13. The system of claim 12, wherein the at least one processor is configured to execute the instructions to perform the method further comprising:
registering the string of characters as the domain name; and
associating the new sound file with the domain name.

14. The system of claim 8, wherein constructing a pronunciation of the string of characters based at least partially on the pronunciations of the universal phonetic representations, comprises:
combining sound files for pronunciations for the universal phonetic representations.

15. A non-transitory computer-readable medium comprising instructions which, when executed by at least one processor, cause the at least one processor to perform a method comprising:
receiving, from a user, a string of characters;
determining components of the string of characters, wherein the components of the string of characters comprise one or more graphemes that are related in the string of characters;
determining universal phonetic representations for the components of the string of characters;
determining pronunciations for the universal phonetic representations;
constructing a pronunciation of the string of characters based at least partially on the pronunciations of the universal phonetic representations;
sending, to the user, a sound file representing the pronunciation of the string of characters;
receiving a user sound file created by the user using a microphone, the user sound file representing a custom pronunciation associated with a subset of the universal phonetic representations corresponding to a portion of the pronunciation of the string of characters;
constructing a new pronunciation of the string of characters based at least partially on the pronunciations for the universal phonetic representations and the custom pronunciation associated with the subset of the universal phonetic representations; and
sending, to the user, a new sound file representing the new pronunciation of the string of characters, wherein the new sound file comprises a combination of a portion of the sound file representing the pronunciation of the string of characters and the user sound file.

16. The non-transitory computer-readable medium of claim 15, the method further comprising:
in response to sending the sound file, receiving, from the user, an indication that at least the portion of the pronunciation of the string of characters is incorrect.

17. The non-transitory computer-readable medium of claim 15, wherein determining pronunciations for the universal phonetic representations, comprises:
determining that at least one pronunciation does not exist for at least one of the universal phonetic representations;

receiving, from the user, a custom pronunciation for at least one of the universal phonetic representations;

constructing a second new pronunciation of the string of characters based at least partially on the pronunciations for the universal phonetic representations and the custom pronunciation for the at least one of the universal phonetic representations; and sending, to the user, a second new sound file representing the second new pronunciation of the string of characters.

18. The non-transitory computer-readable medium of claim 15, wherein determining universal phonetic representations for the components of the string of characters, comprises:

accessing a first data structure that maps the components of the string of characters to the universal phonetic representations based on an international phonetic alphabet, wherein the first data structure comprises a plurality of first nodes with each first node of the plurality of first nodes having a respective weight assigned that corresponds to a pronunciation of a universal phonetic representation; and determining the universal phonetic representations for the components of the string of characters based on the first data structure.

19. The non-transitory computer-readable medium of claim 15, wherein the string of characters corresponds to a domain name.

20. The non-transitory computer-readable medium of claim 19, the method further comprising:

registering the string of characters as the domain name; and associating the new sound file with the domain name.

* * * * *